(12) United States Patent
Spilker, Jr. et al.

(10) Patent No.: US 6,839,024 B2
(45) Date of Patent: Jan. 4, 2005

(54) POSITION DETERMINATION USING PORTABLE PSEUDO-TELEVISION BROADCAST TRANSMITTERS

(75) Inventors: James J. Spilker, Jr., Woodside, CA (US); Matthew Rabinowitz, Portola Valley, CA (US)

(73) Assignee: Rosum Corporation, Redwood City, CA (US)

( * ) Notice: Subject to any disclaimer, the term of this patent is extended or adjusted under 35 U.S.C. 154(b) by 0 days.

(21) Appl. No.: 10/356,698

(22) Filed: Jan. 31, 2003

(65) Prior Publication Data

US 2003/0174090 A1 Sep. 18, 2003

Related U.S. Application Data (63) Continuation-in-part of application No. 10/054,262, filed on Jan. 22, 2002, now abandoned, and a continuation-in-part of application No. 10/003,128, filed on Nov. 14, 2001, and a continuation-in-part of application No. 09/932,010, filed on Aug. 17, 2001, and a continuation-in-part of application No. 09/887,158, filed on Jun. 21, 2001, now abandoned.

(60) Provisional application No. 60/353,283, filed on Feb. 1, 2002, and provisional application No. 60/373,289, filed on Apr. 17, 2002.

(51) Int. Cl.[7] .............................................. G01S 1/08
(52) U.S. Cl. ................... 342/386; 342/357.06; 701/213
(58) Field of Search ................................ 342/386, 450, 342/453, 463, 357.01, 357.06, 457; 701/207, 213; 348/608, 614

(56) References Cited

U.S. PATENT DOCUMENTS

| 4,555,707 A | 11/1985 | Connelly |
| 4,652,884 A | 3/1987 | Starker |
| 4,700,306 A | * 10/1987 | Wallmander ................ 701/207 |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,323,322 A | 6/1994 | Mueller et al. |
| 5,398,034 A | 3/1995 | Spilker, Jr. |

(List continued on next page.)

FOREIGN PATENT DOCUMENTS

| GB | 2 222 922 A | 3/1990 |
| GB | 2 254 508 A | 10/1992 |

OTHER PUBLICATIONS

Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18–21, pp. 1449–1453, vol. 2, XP010520871, 2000, Piscataway, NJ, USA, IEEE, USA, ISBN; 9–7803–6463–5, Chapter I and III.

Rabinowitz, M., et al., "Positioning Using the ATSC Digital Television Signal," Rosum whitepaper, Online1 2001, XP002235053, Retrieved from the Internet on Mar. 13, 2003 at URL www.rosum.com/whitepaper 8–7–01.pdf.

EP Abstract/Zusammenfassung/Abrege, 02102666.1.

JP Abstract/ vol. 007, No. 241 (P–232), Oct. 26, 1983 & JP58 129277 A (Nihon Musen KK) Aug. 2, 1983.

(List continued on next page.)

Primary Examiner—Dao Phan
(74) Attorney, Agent, or Firm—Richard A. Dunning, Jr.

(57) ABSTRACT

An apparatus, method, and computer-readable media comprise a receiver adapted to receive a plurality of broadcast signals; a signal processor adapted to determine a position based on the received plurality of broadcast signals; a signal generator adapted to generate a ranging signal comprising a known component of a television signal; and a transmitter adapted to broadcast a signal comprising the ranging signal and a position signal comprising a description of the position.

28 Claims, 6 Drawing Sheets

U.S. PATENT DOCUMENTS

| | | | |
|---|---|---|---|
| 5,481,316 | A | 1/1996 | Patel |
| 5,504,492 | A | 4/1996 | Class et al. |
| 5,510,801 | A | 4/1996 | Engelbrecht et al. |
| 5,593,311 | A | 1/1997 | Davies |
| 5,774,829 | A | 6/1998 | Cisneros et al. |
| 5,920,284 | A | 7/1999 | Victor |
| 5,952,958 | A | 9/1999 | Speasl et al. |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,147,642 | A | 11/2000 | Perry et al. |
| 6,181,921 | B1 | 1/2001 | Konisi et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,433,740 | B1 | 8/2002 | Gilhousen |
| 6,437,832 | B1 * | 8/2002 | Grabb et al. ................ 348/614 |
| 2003/0122711 | A1 | 7/2003 | Panasik et al. |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.

Spilker, Jr., J.J., "Fundamentals of Signal Tracking Theory," *Global Positioning System: Theory and Applications* (1994), vol. 1, Chapter 7, pp. 245–327.

Van Dierendock, A.J., "GPS Receivers," *Global Positioning System: Theory and Applications* (1995), vol. 1, Chapter 8, pp. 329–407.

* cited by examiner

POSITION DETERMINATION USING PORTABLE PSEUDO-TELEVISION BROADCAST TRANSMITTERS

CROSS-REFERENCE TO RELATED APPLICATIONS

This application is a continuation-in-part of U.S. Nonprovisional patent application Ser. No. 09/887,158, "Position Location using Broadcast Digital Television Signals," by James J. Spilker Jr. and Matthew Rabinowitz, filed Jun. 21, 2001 now abandoned; Ser. No. 09/932,010, "Position Location using Terrestrial Digital Video Broadcast Television Signals," by Matthew Rabinowitz and James J. Spilker Jr., filed Aug. 17, 2001; Ser. No. 10/054,262, "Time-Gated Noncoherent Delay Lock Loop Tracking of Digital Television Signals," by James J. Spilker, Jr. and Matthew Rabinowitz, filed Jan. 22, 2002 now abandoned; and Ser. No. 10/003,128, "Robust Data Transmission Using Broadcast Digital Television Signals," by Jimmy K. Omura, James J. Spilker Jr. and Matthew Rabinowitz, filed Nov. 14, 2001, the disclosures thereof incorporated herein by reference herein in their entirety.

This application claims the benefit of U.S. Provisional Patent Applications Ser. No. 60/373,289, "Using Portable Television Broadcast Signals to Provide Localized Position in Three Dimensions," by James J. Spilker Jr., Matthew Rabinowitz, and Patrick E. Maloney, filed Apr. 17, 2002; and Ser. No. 60/353,283, "Using Portable Television Broadcast Signals to Provide Localized Position," by Matthew Rabinowitz, Matthew D. Pierce, and Patrick E. Maloney, filed Feb. 1, 2002, the disclosures thereof incorporated herein by reference in their entirety.

This application is related to U.S. Provisional Patent Application Ser. No. 60/293,812, "DTV Monitor System Unit (MSU)," by James J. Spilker and Matthew Rabinowitz, filed May 25, 2001, the disclosure thereof incorporated herein by reference in its entirety.

BACKGROUND

The present invention relates generally to position determination using broadcast television signals, and particularly to position determination using components of broadcast television signals transmitted by portable transmitters.

SUMMARY

In general, in one aspect, the invention features an apparatus comprising a receiver adapted to receive a plurality of broadcast signals; a signal processor adapted to determine a position based on the received plurality of broadcast signals; a signal generator adapted to generate a ranging signal comprising a known component of a television signal; and a transmitter adapted to broadcast a signal comprising the ranging signal and a position signal comprising a description of the position.

Particular implementations can include one or more of the following features. The known component of the television signal represents at least one of the group comprising a synchronization code, found in an American Television Standards Committee (ATSC) digital television signal, comprising at least one of the group comprising a Field Synchronization Segment within an ATSC data frame, and a Synchronization Segment within a Data Segment within an ATSC data frame; a scattered pilot carrier found in a Japanese Integrated Services Digital Broadcasting-Terrestrial (ISDB-T) signal; a scattered pilot carrier found in a European Telecommunications Standards Institute (ETSI) Digital Video Broadcasting-Terrestrial (DVB-T) signal; and a signal, found in an analog television signal, comprising at least one of the group comprising a horizontal synchronization pulse, a horizontal blanking pulse, a horizontal blanking pulse and a horizontal synchronization pulse, a chirp-type signal, and a vertical interval test signal. The plurality of broadcast signals comprises at least one of a broadcast television signal; and a satellite positioning system signal. The signal processor derives a time synchronization signal from the plurality of broadcast signals, further comprising a clock adapted to provide a clock signal in accordance with the synchronization signal; and wherein the signal generator generates the known component of the television signal in accordance with the clock signal. The signal processor derives the time synchronization signal from a global positioning system (GPS) signal. The position signal comprises digital data, and wherein the ranging signal comprises a plurality of digital television (DTV) frames, each frame comprising a plurality of data segments, and wherein the signal processor is further adapted to encode the digital data as codewords; and the transmitter is further adapted to replace data segments within the DTV frames with the codewords. The transmitter is further adapted to transmit the ranging signal over a plurality of television channels.

In general, in one aspect, the invention features a method, apparatus, and computer-readable media. It comprises receiving a plurality of broadcast signals; determining a position based on the received plurality of broadcast signals; generating a ranging signal comprising a known component of a television signal; and broadcasting a signal comprising the ranging signal and a position signal comprising a description of the position.

Particular implementations can include one or more of the following features. The known component of the television signal represents at least one of the group comprising a synchronization code, found in an American Television Standards Committee (ATSC) digital television signal, comprising at least one of the group comprising a Field Synchronization Segment within an ATSC data frame, and a Synchronization Segment within a Data Segment within an ATSC data frame; a scattered pilot carrier found in a Japanese Integrated Services Digital Broadcasting-Terrestrial (ISDB-T) signal; a scattered pilot carrier found in a European Telecommunications Standards Institute (ETSI) Digital Video Broadcasting-Terrestrial (DVB-T) signal; and a signal, found in an analog television signal, comprising at least one of the group comprising a horizontal synchronization pulse, a horizontal blanking pulse, a horizontal blanking pulse and a horizontal synchronization pulse, a chirp-type signal, and a vertical interval test signal. The plurality of broadcast signals comprises at least one of a broadcast television signal; and a satellite positioning system signal. Implementations comprise deriving a time synchronization signal from the plurality of broadcast signals; providing a clock signal in accordance with the synchronization signal; and generating the known component of the television signal in accordance with the clock signal. Deriving a time synchronization signal comprises deriving the time synchronization signal from a global positioning system (GPS) signal. The position signal comprises digital data and the ranging signal comprises a plurality of digital television (DTV) frames, each frame comprising a plurality of data segments, and implementations comprise encoding the digital data as codewords; and replacing data segments within the DTV frames with the codewords. Implementations comprise transmitting the ranging signal over a plurality of television channels.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

As used herein, the term "server" generally refers to an electronic device or mechanism, and the term "message" generally refers to an electronic signal representing a digital message. As used herein, the term "mechanism" refers to hardware, software, or any combination thereof. These terms are used to simplify the description that follows. The servers and mechanisms described herein can be implemented on any standard general-purpose computer, or can be implemented as specialized devices.

Introduction

Broadcast television signals can be used to determine the position of a user terminal. Techniques for determining the position of a user terminal using the American Television Standards Committee (ATSC) digital television (DTV) signal are disclosed in commonly-owned copending U.S. Non-provisional patent application Ser. No. 09/887,158, "Position Location using Broadcast Digital Television Signals," by James J. Spilker and Matthew Rabinowitz, filed Jun. 21, 2001, the disclosure thereof incorporated by reference herein in its entirety. Techniques for determining the position of a user terminal using the European Telecommunications Standards Institute (ETSI) Digital Video Broadcasting-Terrestrial (DVB-T) signal are disclosed in commonly-owned copending U.S. Provisional Patent Application Ser. No. 60/337,834, "Wireless Position Location Using the Japanese ISDB-T Digital TV Signals," by James J. Spilker, filed Nov. 9, 2001, the disclosure thereof incorporated by reference herein in its entirety. Techniques for determining the position of a user terminal using the Japanese Integrated Services Digital Broadcasting-Terrestrial (ISDB-T) signal are disclosed in commonly-owned copending U.S. Non-provisional patent application Ser. No. 09/932,010, "Position Location using Terrestrial Digital Video Broadcast Television Signals," by James J. Spilker and Matthew Rabinowitz, filed Aug. 17, 2001, the disclosure thereof incorporated by reference herein in its entirety. Techniques for determining the position of a user terminal using the NTSC (National Television System Committee) analog television (TV) signal are disclosed in commonly-owned copending U.S. Non-provisional patent applications Ser. No. 10/054,302, "Position Location using Broadcast Analog Television Signals," by James J. Spilker and Matthew Rabinowitz, filed Jan. 22, 2002, and Ser. No. 10/159,831, "Position Location Using Ghost Canceling Reference Television Signals," by James J. Spilker and Matthew Rabinowitz, filed May 31, 2002, the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user terminal can be determined with accuracy. Suitable components within the ATSC digital television signal include synchronization codes such as the Field Synchronization Segment within an ATSC data frame and the Synchronization Segment within a Data Segment within an ATSC data frame. Suitable components within the ETSI DVB-T and ISDB-T digital television signals include scattered pilot carriers. Suitable components within the NTSC analog television signal include the horizontal synchronization pulse, the horizontal blanking pulse, the horizontal blanking pulse and horizontal synchronization pulse taken together, the ghost canceling reference signal, the vertical interval test signal, and other chirp-type signals.

Positioning techniques using television signals should revolutionize the technology of navigation and position location. The ubiquitous availability of television signals allows for coverage anywhere that television is available. In fact, with the use of time-gated delay-lock loops, it is possible to use television signals for positioning even beyond those areas where television reception is available. Details are provided in, for example, U.S. Non-provisional patent application Ser. No. 10/054,262, "Time-Gated Noncoherent Delay Lock Loop Tracking of Digital Television Signals," by James J. Spilker, Jr. and Matthew Rabinowitz, filed Jan. 22, 2002. However, in some situations, it is possible that a multiplicity of strong television signals will not be available due to less than adequate television availability, severe building attenuation, a severe multipath environment, or other causes. In addition, while television signals can provide very good positioning information on the horizontal plane, there may be situations, such as determining the position of police and firemen in a building, where precise vertical information is necessary as well.

According to one aspect of the present invention, a portable pseudo-television transmitter is provided. In cases where a multiplicity of strong television signals are not available, for example, in a building, one or more pseudo-television transmitters can be brought to the site to provide additional signals for precise positioning. In one aspect, each portable pseudo-television transmitter has the ability to determine its position precisely using television-signal positioning techniques, GPS positioning techniques, or other standard positioning techniques. For example, the pseudo-television transmitters can contain television monitor units similar to those described in U.S. Provisional Patent Applications Ser. No. 60/293,812, "DTV Monitor System Unit (MSU)," by James J. Spilker and Matthew Rabinowitz, filed May 25, 2001, the disclosure thereof incorporated herein by reference in its entirety. The PTTs have many applications, for example, for emergency location of firemen or other emergency personnel in a building or other environment. The PTTs can be mounted on fire trucks or other emergency vehicles.

One or more of the PTTs can be hand-carried to the entrance to the building or facility of operation. An emergency location handset (also referred to herein as a "user terminal") carried by emergency personnel receives signals from the small rugged PTTs that are carried in the emergency vehicles or placed at convenient locations at the base of the site. The user terminal can also use other signals, such as those provided by broadcast TV transmitters and satellite positioning systems such as GPS, to determine its position.

The emergency location handset recovers pseudo-ranges from each of these transmitters, and then relays these measurements to an emergency location processor (also referred to herein as a "location server") that can also be located at the emergency site if desired. The emergency location processor then displays the location of each of the emergency handsets in both horizontal position and in height or building floor. Thus the leader of the emergency team not only can communicate with each of the emergency handsets but also can see a display in three dimensions of the locations of each of the handsets.

The PTTs can transmit at much lower power than a conventional TV transmitter and can use specially assigned TV frequencies in the Channel 60 or above frequency range, for example. Alternatively, the PTTs can use television channels that are not already allotted to television stations in a given area. The power transmitted by the PTTs can be greatly reduced relative to that needed by commercial TV transmitters for several reasons. The PTTs are much closer to the emergency personnel; instead of 50 miles away they might only be 500 feet away, a factor of 500 in distance or in power even for a $4^{th}$-power equation, a factor of 6.25× $10^{10}$ or 107.9 dB power reduction. Even a square law power relationship yields a factor of 53.9 dB. Assuming a TV transmitter ERP of 1 Mw or 60 dB, the square law performance would reduce the power required to 4 w. In addition, the PTT signal can carry continuous repeats of the known components useful for ranging, such as the DTV field synchronization signal, instead of only once per 313 segments. This allows another factor of 313 reduction in power.

Finally, the signal power required for precise positioning is far less than that needed for TV reception by a factor of perhaps 50 dB or more. Furthermore, the 6 MHz signal bandwidth provides a wider bandwidth than the GPS signal by a factor of approximately 6.

Figure 1:
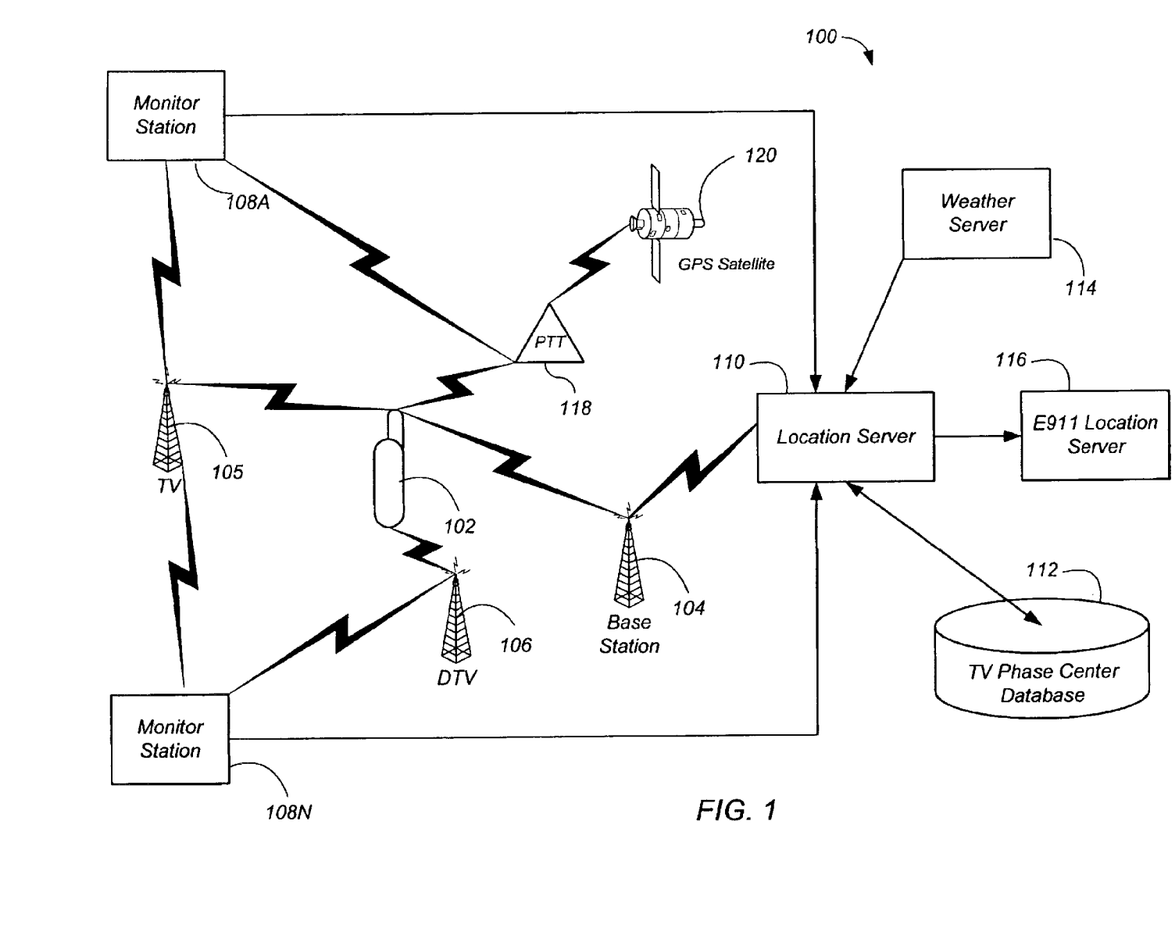
FIG. 1 depicts an example implementation that includes a user terminal that communicates over an air link with an optional base station.

Referring to FIG. 1, an example implementation 100 includes a user terminal 102 that communicates over an air link with an optional base station 104. In some implementations, user terminal 102 is a wireless telephone and base station 104 is a wireless telephone base station. In some implementations, base station 104 is part of a mobile MAN (metropolitan area network) or WAN (wide area network). In other implementations, user terminal 102 communicates directly with a location server 110, and base station 104 is not needed.

FIG. 1 is used to illustrate various aspects of the invention but the invention is not limited to this implementation. For example, the phrase "user terminal" is meant to refer to any object capable of implementing the position location techniques described herein. Examples of user terminals include PDAs, mobile phones, cars and other vehicles, and any object which could include a chip or software implementing the position location techniques described herein. Further, the term "user terminal" is not intended to be limited to objects which are "terminals" or which are operated by "users."

Position Location Performed by a DTV Location Server

Figure 2:
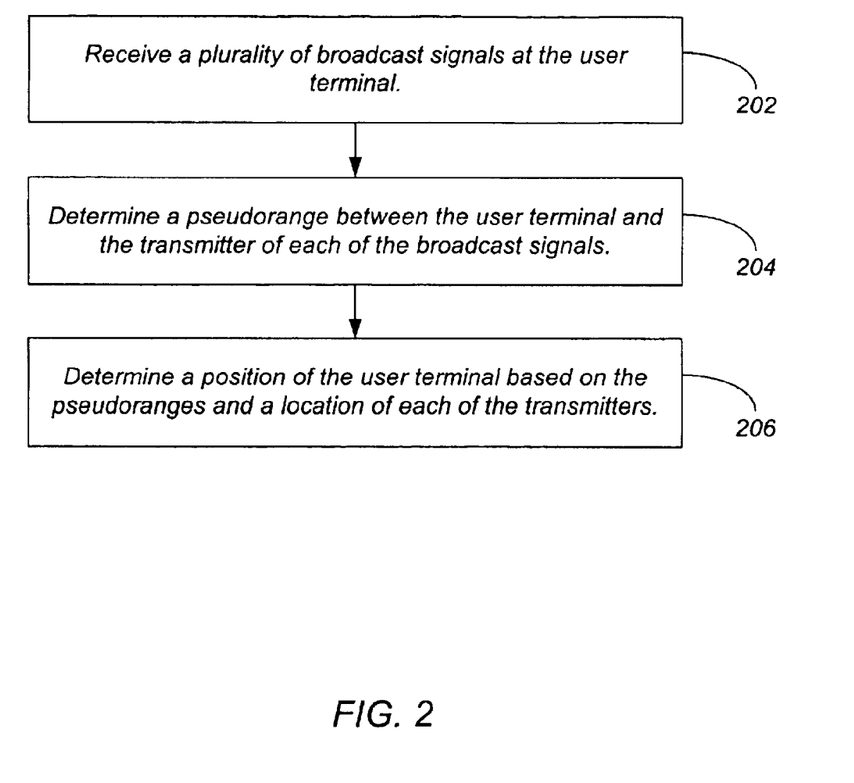
FIG. 2 illustrates an operation of the implementation of FIG. 1.

FIG. 2 illustrates an operation of implementation 100. User terminal 102 receives a plurality of broadcast signals (step 202). The broadcast signals include one or more ranging signals transmitted by one or more pseudo-television transmitters (PTT) 118. As described below, each ranging signal broadcast by a PTT 118 includes a known component of a television signal. In one embodiment, the position of user terminal 102 is determined based only upon the PTT ranging signals. However, if other suitable signal are available, they can be used as well. Accordingly, the broadcast signals received by user terminal 102 can also include one or more DTV signals transmitted by one or more DTV transmitters 106 and one or more analog TV signals transmitted by one or more TV transmitters 105.

In one embodiment, user terminal 102 can determine its position based on these types of signals. User terminal 102 can scan over the available channels and acquire signals from PTTs 118 alone or in conjunction with standard, fixed, terrestrial television towers. Having acquired a signal, user terminal 102 determines whether the signal includes a signal component matching one of the known components the user terminal can use for ranging.

Various methods can be used to select which DTV channels to use in position location. In one implementation, a location server 110 tells user terminal 102 of the best DTV channels to monitor. In one implementation, user terminal 102 exchanges messages with location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing. This selection is based on the power levels of the DTV channels, as well as the directions from which each of the signals are arriving, so as to minimize the dilution of precision (DOP) for the position calculation. Similar methods can be used to select TV channels for use in position determination.

User terminal 102 determines a pseudo-range between the user terminal 102 and the transmitter of each selected broadcast signal (step 204). Each pseudo-range represents the time difference (or equivalent distance) between a time of transmission from a transmitter of a component of the broadcast signal and a time of reception at the user terminal 102 of the component, as well as a clock offset at the user terminal.

User terminal 102 transmits the pseudo-ranges to location server 110. In one implementation, location server 110 is implemented as a general-purpose computer executing software designed to perform the operations described herein. In another implementation, location server 110 is implemented as an ASIC (application-specific integrated circuit). In one implementation, location server 110 is implemented within or near base station 104. Location server 110 can also be implemented as a portable unit, to be transported by emergency vehicles and crews.

The broadcast signals are also received by a plurality of monitor units 108A through 108N. Each monitor unit 108 can be implemented as a small unit including a transceiver and processor, and can be mounted in a convenient location such as a utility pole, transmitters 105 and 106, or base stations 104. In one implementation, monitor units 108 are implemented on satellites. Monitor unit 108 can also be implemented as a portable unit, to be transported by emergency vehicles and crews.

Each monitor unit 108 measures, for each of the received signals, a time offset between the local clock of the transmitter of the signal and a reference clock. In one implementation the reference clock is derived from GPS signals. The use of a reference clock permits the determination of the time offset for each transmitter when multiple monitor units 108 are used, because each monitor unit 108 can determine the time offset with respect to the reference clock. Thus, offsets in the local clocks of the monitor units 108 do not affect these determinations.

In another implementation, no external time reference is needed. According to this implementation, a single monitor unit receives signals from all of the same transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \quad (1)$$

that can be described by a, b, c, and T. In either implementation, each measured time offset is transmitted periodically to the location server using the Internet, a secured modem connection, as part of DTV broadcast data, or the like. In one implementation, the location of each monitor unit 108 is determined using GPS receivers.

Location server 110 receives information describing the phase center (i.e., the location) of each TV transmitter 105 and DTV transmitter 106 from a database 112. In one implementation, the phase center of each transmitter is measured by using monitor units 108 at different locations to measure the phase center directly. One approach to doing this is to use multiple time-synchronized monitor units at known locations. These units make pseudo-range measurements to a transmitter at the same time instant, and those measurements can be used to inverse-triangulate the location of the transmitter phase centers. In another implementation, the phase center of each transmitter is measured by surveying the antenna phase center. Once determined, the phase centers are stored in a data base 112.

Each PTT 118 determines its location, as described below, and broadcasts information describing the position. Location server 110 can receive the PTT position information directly from the PTTs 118, or from some other device such as phase center database 112.

In one implementation, location server 110 receives weather information describing the air temperature, atmospheric pressure, and humidity in the vicinity of user terminal 102 from a weather server 114. The weather information is available from the Internet and other sources. location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

Location server 110 can also receive from base station 104 information which identifies a general geographic location of user terminal 102. For example, the information can identify a cell or cell sector within which a cellular telephone is located. This information is used for ambiguity resolution, as described below.

Figure 3:
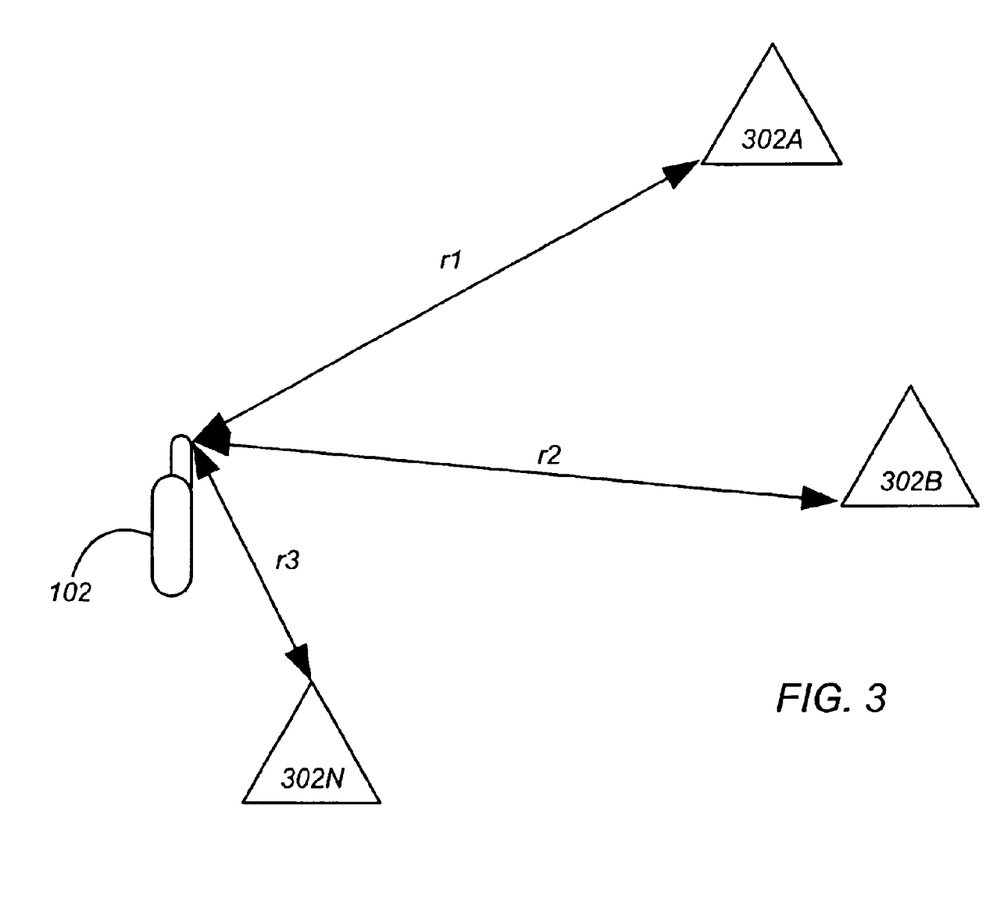
FIG. 3 depicts the geometry of a position determination using three transmitters.

Location server 110 determines a position of user terminal 102 based on the pseudo-ranges and a location and clock offset of each of the transmitters (step 206). FIG. 3 depicts the geometry of a position determination using three transmitters 302. Transmitter 302A is located at position (x1, y1). The range between user terminal 102 and transmitter 302A is r1. Transmitter 302B is located at position (x2, y2). The range between user terminal 102 and transmitter 302B is r2. Transmitter 302N is located at position (x3, y3). The range between user terminal 102 and transmitter 302N is r3.

Location server 110 may adjust the value of each pseudo-range according to the tropospheric propagation velocity and the time offset for the corresponding transmitter 302. Location server 110 uses the phase center information from database 112 to determine the position of each transmitter 302.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the transmitters.

The three pseudo-range measurements pr1, pr2 and pr3 are given by $$pr1 = r1 + T \quad (2)$$

$$pr2 = r2 + T \quad (3)$$

$$pr3 = r3 + T \quad (4)$$

The three ranges can be expressed as $$r1 = |X - X1| \quad (5)$$

$$r2 = |X - X2| \quad (6)$$

$$r3 = |X - X3| \quad (7)$$

where X represents the two-dimensional vector position (x, y) of user terminal 102, X1 represents the two-dimensional vector position (x1, y1) of transmitter 302A, X2 represents the two-dimensional vector position (x2, y2) of transmitter 302B, and X3 represents the two-dimensional vector position (x3, y3) of transmitter 302N. These relationships produce three equations in which to solve for the three unknowns x, y, and T. Location server 110 solves these equations according to conventional well-known methods. In an E911 application, the position of user terminal 102 is transmitted to E911 location server 116 for distribution to the proper authorities. In another application, the position is transmitted to user terminal 102. In an emergency application, the position can be transmitted directly to portable receivers carried by emergency crews.

Now, techniques for projecting the measurements at the user terminal 102 to a common instant in time are described. Note that this is not necessary if the clock of the user terminal 102 is stabilized or corrected using a signal from the cellular base station, a transmitter 105, 106, or a PTT 118. When the user clock is not stabilized, or corrected, the user clock offset can be considered to be a function of time, T(t). For a small time interval, Δ, the clock offset, T(t), can be modeled by a constant and a first order term. Namely, $$T(t + \Delta) = T(t) + \frac{\partial T}{\partial t} \Delta \quad (8)$$

We now reconsider equations (2a)–(4a) treating the clock offset as a function of time. Consequently, the pseudo-range measurements are also a function of time. For clarity, we assume that the ranges remain essentially constant over the interval Δ. The pseudo-range measurements may be described as:

$$pr1(t1) = r1 + T(t1) \quad (2b)$$

$$pr2(t2) = r2 + T(t2) \quad (3b)$$

$$prN(tN) = rN + T(tN) \quad (4b)$$

In one embodiment, the user terminal 102 commences with an additional set of pseudo-range measurements at some time Δ after the initial set of measurements. These measurements may be described:

$$pr1(t1 + \Delta) = r1 + T(t1) + \frac{\partial T}{\partial t}\Delta \quad (2c)$$

$$pr2(t2 + \Delta) = r2 + T(t2) + \frac{\partial T}{\partial t}\Delta \quad (3c)$$

$$prN(tN + \Delta) = rN + T(tN) + \frac{\partial T}{\partial t}\Delta \quad (4c)$$

The user terminal 102 then projects all the pseudo-range measurements to some common point in time so that the effect of the first order term is effectively eliminated.

For example, consider if some common reference time t0 is used. Applying equations (2b–4b). and (2c–4c) it is straightforward to show that we can project the measurements to a common instant of time as follows:

$$pr1(t0) = pr1(t1) + [pr1(t1+\Delta) - pr1(t1)](t0-t1)/\Delta \quad (2d)$$

$$pr2(t0) = pr2(t2) + [pr2(t2+\Delta) - pr2(t2)](t0-t2)/\Delta \quad (3d)$$

$$prN(t0) = prN(tN) + [prN(tN+\Delta) - prN(tN)](t0-tN)/\Delta \quad (4d)$$

These projected pseudo-range measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms may be accounted for by making more than two pseudo-range measurements for each projection. Notice also that there are many other approaches to implementing this concept of projecting the pseudo-range measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each transmitter. These tracking loops effectively interpolate between pseudo-range measurements. The state of each of these tracking loops is sampled at the same instant of time.

In another implementation, user terminal 102 does not compute pseudo-ranges, but rather takes measurements of the received signals that are sufficient to compute pseudo-range, such as a segment of the correlator output, and transmits these measurements to location server 110. Location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by location server 110, base station 104, one or more transmitters 105, 106, PTTs 118, or any combination thereof. User terminal 102 then measures the pseudo-ranges and solves the simultaneous equations as described above. This implementation is now described.

User terminal 102 receives the time offset between the local clock of each transmitter and a reference clock. User terminal 102 also receives information describing the phase center of each transmitter from database 112.

User terminal 102 receives the tropospheric propagation velocity computed by location server 110. In another implementation, user terminal 102 receives weather information describing the air temperature, atmospheric pressure, and humidity in the vicinity of user terminal 102 from weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives signals from a plurality of transmitters including at least one PTT 118 and determines a pseudo-range between the user terminal 102 and each transmitter. User terminal 102 then determines its position based on the pseudo-ranges and the phase centers of the transmitters.

In any of these of the implementations, should only two transmitters be available, the position of user terminal 102 can be determined using the two transmitters and the offset T computed during a previous position determination. The values of T can be stored or maintained according to conventional methods. This assumes, of course, that the local clock is stable enough over the period of time since T was computed.

In one implementation, base station 104 determines the clock offset of user terminal 102. In this implementation, only two transmitters are required for position determination. Base station 104 transmits the clock offset T to location server 110, which then determines the position of user terminal 102 from the pseudo-range computed for each of the transmitters.

Figure 4:
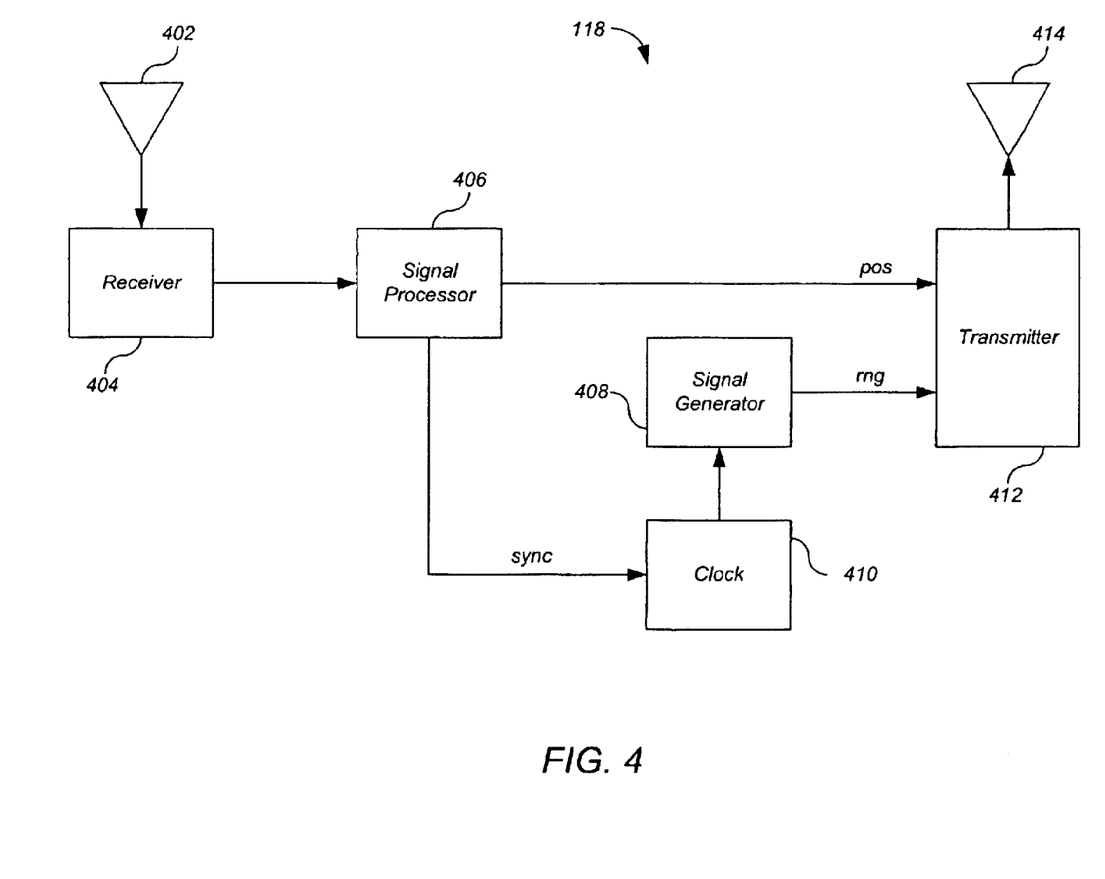
FIG. 4 is a block diagram of the architecture of a PTT according to one implementation.

In another implementation, when only one or two transmitters are available for position determination, GPS is used to augment the position determination, and each GPS satellite is treated as another transmitter in the positioning solution Pseudo-television Transmitter Architecture FIG. 4 is a block diagram of the architecture of a PTT 118 according to one implementation. PTT 118 includes a receive antenna 402, receiver 404, a signal processor 406, a signal generator 408, a clock 410, a transmitter 412, and a transmit antenna 414. Of course, antennas 402 and 414 can be implemented as a single unit.

Figure 5:
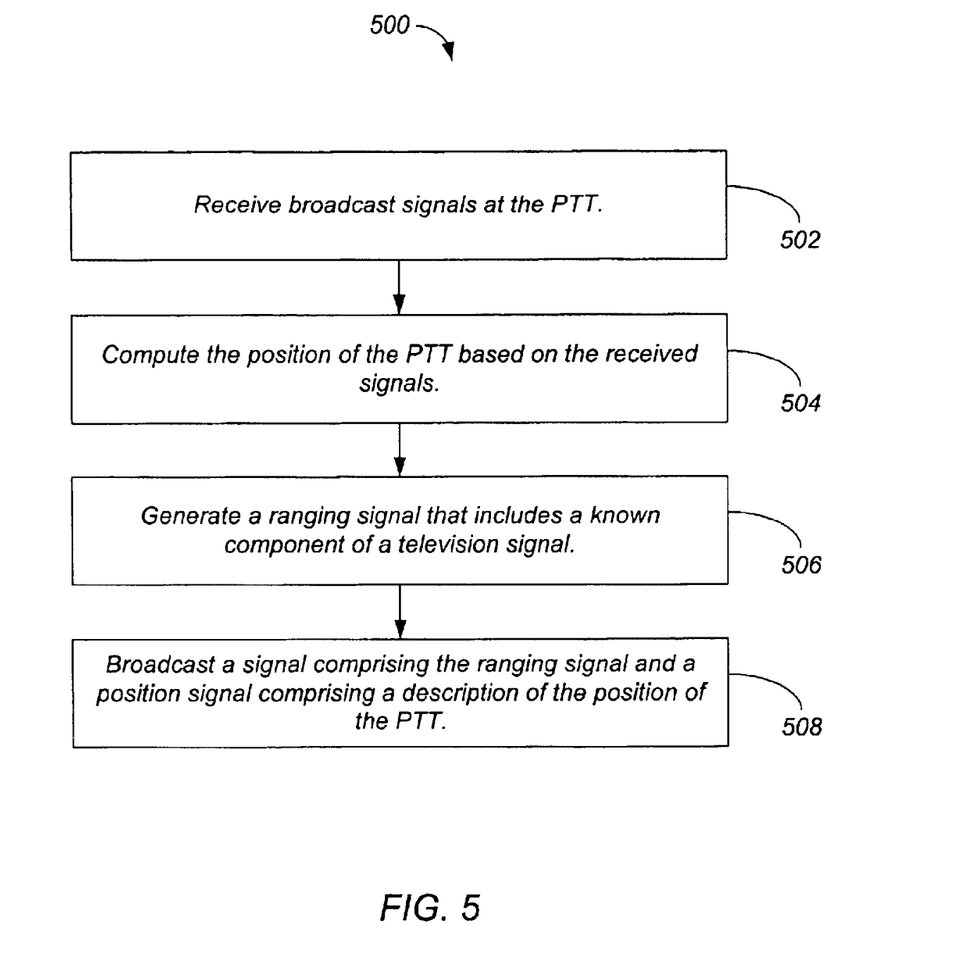
FIG. 5 is a flowchart of a process performed by PTT according to one implementation.

FIG. 5 is a flowchart of a process 500 performed by PTT 118 according to one implementation. Process 500 is described with reference to FIG. 4, but is equally applicable to other implementations, as will be apparent to one skilled in the relevant arts after reading this description. Antenna 402 receives a plurality of broadcast signals that are useful for position determination (step 502). Receiver 404 downconverts the received signals to intermediate frequency (IF) or baseband for processing. Signal processor 406 computes the position of the PTT 118 based on the received signals (step 504), for example according to methods described above for user terminal 102. The signals used for position determination can include DTV signals, TV signals, signals transmitted by other PTTs, satellite positioning system signals such as global positioning system (GPS) signals and other types of signals useful for position determination. Signal processor 406 provides a position signal (pos) to transmitter 412 that contains information describing the position of PTT 118.

Signal processor 406 also generates a time synchronization signal (sync) based on the received signals, and provides the time synchronization signal to clock 410. In one implementation, the timing signal is obtained from a GPS signal. Clock 410 generates a clock signal based on the time synchronization signal (that is, clock 410 synchronizes using the time synchronization signal). In a preferred embodiment, clock 410 is a very accurate clock employing rubidium standard. Signal generator 508 generates a ranging signal (rng) in accordance with the clock signal (step 506). The ranging signal includes a known component of a television signal.

The known component in the ranging signal can include synchronization codes such as the Field Synchronization Segment within an ATSC data frame and the Synchronization Segment within a Data Segment within an ATSC data frame, scattered pilot carriers within the ETSI DVB-T and ISDB-T digital television signals, and the horizontal synchronization pulse, the horizontal blanking pulse, the horizontal blanking pulse and horizontal synchronization pulse taken together, the ghost canceling reference signal, and the vertical interval test signal within the NTSC analog television signal.

According to one embodiment, PTTs 118 broadcast one or more types of television signal that can be received by user terminals 102 within the appropriate area. For example, PTTs 118 can broadcast signals similar to the ATSC digital television specification, the ETSI-DVB digital television specification, ISDB-T digital television specification, the NTSC analog television specification, and/or the NTSC analog television specification with or without the embedded GCR signal. Each of the PTTs operating in a single area can use different codes so they can share a single channel.

In one embodiment, PTTs 118 broadcast only those known components of the television signal that are useful for position location. These signals can include known PN sequences, chirp signals, or synchronization codes, as described above.

In one implementation PTTs 118 transmit continuously repeated field synchronization signals, and modulate the sign of each block field synchronization word or set of words, thus providing a bi-phase modulation of the field synchronization segments each with duration of approximately 77 microseconds. This form of data modulation can carry data rates of approximately 129,326 bps or any submultiple thereof. For example, the field synchronization can be bi-phase modulated once every frame of 313 segments to obtain a 41 bps data stream. This data stream can be coded with rate ½ or other coding to improve error rate performance.

In one embodiment, PTTs 118 broadcast over many channels simultaneously, thereby increasing the bandwidth of the broadcast signal and increasing the resistance to multipath, further ensuring that a user terminal 102 inside the area would be able to determine its position using the signals. These extra-wide bandwidth signals can contain similar types of synch codes, chirp signals, and/or PN sequences as the standard, on-channel versions, except that the chipping rate (or clocking rate) of these known signals can be considerably increased.

In one embodiment, multiple PTTs 118 share a single TV frequency channel by assigning a different time slot to each PTT. Each of four PTTs 118 could, for example, transmit for a 20% duty factor leaving the remaining time percentage of 20% for guard time between transmissions. Note that GPS pseudolites also use such time gating of the transmissions so as to avoid the near/far signal level problem.

Transmitter 412 transmits over antenna 414 a signal comprising the ranging signal and a position signal comprising a description of the position (step 508). These signals are used to determine the position of the user terminal, as described above. Transmitter 412 can broadcast the position signal within or along with the ranging signal. For example, a pseudo-television transmitter can broadcasting a signal similar to the PN sequence used for the field synchronization segment in the ATSC DTV standard, and can modulate these transmissions by changing the sign of subsequent field synchronization segments. These known components can be transmitted at 100% duty factor, or with time gaps in between the known components, which may be filled with other data, as is done in the ATSC DTV standard.

In one embodiment, the position information is inserted as data into one or more of the frames in an ATSC-type broadcast. Such techniques are described in U.S. patent application Ser. No. 10/003,128, "Robust Data Transmission Using Broadcast Digital Television Signals," by Jimmy K. Omura, James J. Spilker Jr., and Matthew Rabinowitz, filed Nov. 14, 2001, the disclosure thereof incorporated herein by reference in its entirety. According to this technique, the position information comprises digital data, and the ranging signal comprises a plurality of digital television (DTV) frames. Each frame comprises a plurality of data segments. Signal processor 406 encodes the digital data as codewords. Transmitter 412 replaces one or more of the data segments within the DTV frames with the codewords.

In another embodiment, the position information is modulated into a chirp-type signal by, for example, changing the sign on the chirp pattern.

In addition to providing horizontal positioning, in another aspect of the invention, the introduction of four PTTs to an area could allow a user terminal 102 to resolve both its horizontal and vertical position.

Figure 6:
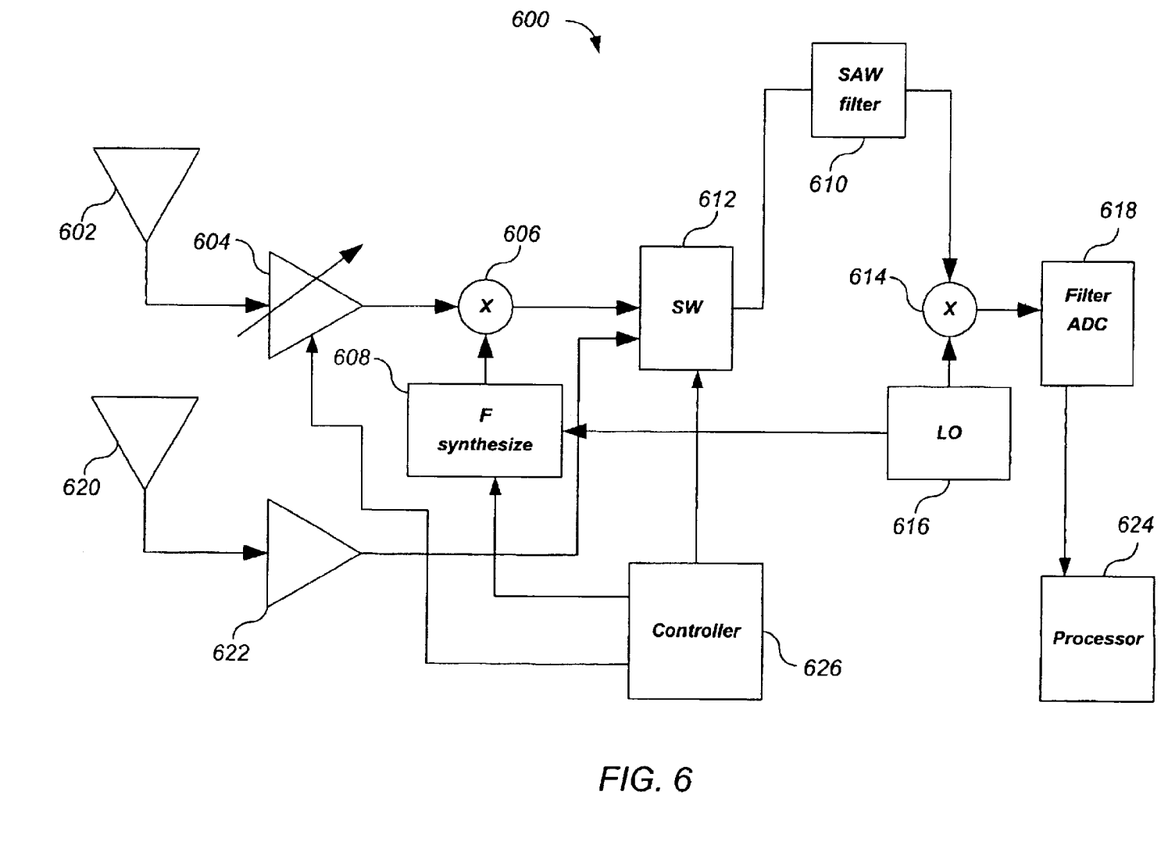
FIG. 6 shows a receiver capable of processing both television signals and GPS signals for position determination according to one embodiment.

FIG. 6 shows a receiver 600 capable of processing both television signals and GPS signals for position determination according to one embodiment. Receiver 600 can replace receiver 404 and signal processor 406 in PTT 118 of FIG. 4. A TV antenna 602 receives the TV signals, including signals generated by TV transmitters 105, DTV transmitters 106, and other PTTs 118. In other implementations, the same antenna can be used for both the GPS and the TV signal. This antenna can be coupled to a tuning circuit in order to resonate at the different frequencies. Alternately, this antenna can have two feeds, one which outputs a signal in the GPS band and one which outputs a signal in the TV band, with a switch determining which feed outputs to the LNA in the receiver front end. A low noise amplifier and RF filter 604 amplifies and filters the received TV signals. The RF filter is tunable over the range of at least 450 MHz to 700 MHz, or the band for whatever set of TV signals is selected. The low noise amplifier includes an automatic gain control function. A mixer 606 combines the resulting signal with the output of a frequency synthesizer 608 to up-convert the signal to an IF frequency where a narrow bandwidth SAW filter 610 can be employed. A switch 612 passes the TV signal to SAW filter 610. In order to make use of GPS the IF frequency is the GPS L1 frequency of 1575.42 MHz. Other implementations use the L2 frequency of 1227.6 MHz, which will shortly have a new civil signal, or the new L5 signal in the 1.1 GHz region. In other implementations, a different IF frequency can be used and the GPS signal as well as the TV signal will initially be up-converted or down-converted before bandpass filtering.

A mixer 614 combines the filtered signal with the output of a local oscillator 616 to down-convert the filtered signal to a convenient IF or baseband frequency. In some implementations the IF frequency is 44 MHz, a standard TV IF frequency. Filter/ADC 618 then filters and digitizes the signal. The signal can then be IF sampled at, for example, 27 Msps using a 10 bit ADC. The digitized signal is fed to a processor 624 for processing. A controller 626 controls filter/amplifier 604, frequency synthesizer 608, and switch 612.

A GPS antenna 620, such as a patch antenna, receives the GPS signals. A low noise amplifier and RF filter 622 amplifies and filters the received GPS signals. Switch 612 passes the GPS signal to SAW filter 610. Mixer 614 combines the filtered signal with the output of a local oscillator 616 to down-convert the filtered signal to a convenient IF or baseband frequency. Filter/ADC 618 then filters and digitizes the signal. The signal can then be IF sampled at, for example, 27 Msps using a 10 bit ADC. The digitized signal is fed to processor 624 for processing.

In some implementations, the entire RF section is fabricated as a single integrated circuit, with the exception of the SAW or similar high selectivity bandpass filter, and processor 624 is fabricated as a separate integrated circuit.

Because GPS satellites 120 move rapidly in their orbits, their signals are subject to large Doppler shifts caused by the large relative radial velocities between the GPS satellites and the stationary or slowly moving user terminals 102. These Doppler shifts can range over +/−5.5 kHz. In addition each GPS satellite 120 has a different pseudo-noise (PN) code. Thus in order to obtain accurate pseudo-range measurements with GPS signals, it is necessary to determine the Doppler shifts of the GPS satellites 120 and the PN codes.

GPS satellites 120 transmit an almanac which gives approximate satellite orbits and velocities as well as clock offsets and other factors for up to 32 GPS satellites. The entire almanac of information for 32 satellites comprises only 1 KB of information. With this information and knowledge of very crude position information and user terminal clock time, user terminal 102 can estimate the Doppler information for the GPS satellites 120 in view, and their corresponding PN codes, quite easily to much greater precision than needed for initial acquisition by a noncoherent delay lock tracking loop for GPS.

In fact a larger frequency uncertainty is caused by the handset local oscillator which may have a stability of only 5 parts per million. This frequency uncertainty by itself contributes a frequency error of approximately +/−7.9 kHz unless corrected. Corrections to clock 410 of the PTT can be obtained by either tracking the TV pilot carrier or by correction using cell phone signals.

In some implementations location server 110 periodically downloads to the PTTs the GPS almanac data via an air link.

In some implementations PTT 118 computes GPS satellite Doppler from GPS satellite almanac data. Based on its approximate position (within 100 km or so), PTT 118 can determine which GPS satellites 120 are visible at any given time. Monitor stations 108 collect the almanac data for all GPS satellites, and transfer them to PTT 118. PTT 118 then determines satellite visibility and Doppler. The GPS system updates the almanac data about once a week. The GPS satellite Doppler ranges from −5,500 to +5,500 Hz (at 1.575420 GHz). A typical GPS receiver only needs Doppler to within 500 Hz. Provided with good PTT 118 position and time estimates, PTT 118 can compute Doppler to within 1 Hz with almanac data that is a week old. Therefore, assuming that the monitor stations 108 always have the latest almanac data, monitor stations 108 need to upload fresh almanac data to PTT 118 only once a week.

Although the official GPS constellation consists of 24 satellites, in reality there can be up to 28 satellites. Each GPS satellite 120 has a satellite ID called the satellite PN (pseudo-noise) number, which ranges from 1 through 32. The number of bits for one set of almanac data is:

Satellite ID=6 bits (to account for PRN 1–32)

Almanac=182 bits

Total=188 bits.

The entire set of almanac data for 28 satellites needs 28×188=5,264 bits per week.

The GPS standard already provides means of moving this type of information to a user terminal 102. GPS "assistance data" can be delivered in two ways: short message cell broadcast (SMCB) and radio resource location protocol (RRLP) messages in the control channels. SMCB can be used for almanac, ephemeris, ionospheric, and DGPS correction data. The contents of these messages are described in GSM spec 04.35, section 4.2. These messages might be available to battery pack accessories on some PTTs 118, since the protocol is based on a form of SMS.

RRLP messages can carry everything a SMCB message can carry, but can also carry "acquisition assistance" information, which includes code offsets and Doppler data. These messages are described in GSM spec 04.31, annex A.4.2.4. These messages would generally not be available to a battery pack accessory.

In other implementations, monitor stations 108 upload satellite Doppler to PTT 118. In this option, monitor stations 108 keep the almanac data and compute GPS satellite visibility and Doppler estimates. In some implementations, monitor stations 108 use their own location (instead of the PTT 118 location, which neither the monitor station nor the PTT 118 knows at the time) in the estimation. One Hertz resolution of the Doppler is adequate (considering the uncertainty due to the local oscillator in the PTT 118). Furthermore, the maximum numbers of Doppler sets is the number of visible satellites, not the number of satellites in constellation. The number of bits required for every contact is:

Satellite ID=6 bits (to account for PRN 1–32)

Doppler=14 bits (to account for +/−5,500 Hz in 1-Hz resolution)

Total=20 bits.

Assuming a maximum of 12 visible satellites; 12*20=240 bits per contact.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    a receiver adapted to receive a plurality of broadcast signals;
    a signal processor adapted to determine a position of the apparatus based on the received plurality of broadcast signals;
    a signal generator adapted to generate a ranging signal comprising a known component of a television signal; and
    a transmitter adapted to broadcast a signal comprising the ranging signal and a position signal comprising a description of the position of the apparatus.

2. The apparatus of claim 1, wherein the known component of the television signal represents at least one of the group comprising:
    a synchronization code, found in an American Television Standards Committee (ATSC) digital television signal, comprising at least one of the group comprising
    a Field Synchronization Segment within an ATSC data frame, and
    a Synchronization Segment within a Data Segment within an ATSC data frame;
    a scattered pilot carrier found in a Japanese Integrated Services Digital Broadcasting-Terrestrial (ISDB-T) signal;
    a scattered pilot carrier found in a European Telecommunications Standards Institute (ETSI) Digital Video Broadcasting—Terrestrial (DVB-T) signal; and
    a signal, found in an analog television signal, comprising at least one of the group comprising
    a horizontal synchronization pulse,
    a horizontal blanking pulse,
    a horizontal blanking pulse and a horizontal synchronization pulse,
    a chirp-type signal, and
    a vertical interval test signal.

3. The apparatus of claim 1, wherein the plurality of broadcast signals comprises at least one of:
    a broadcast television signal; and
    a satellite positioning system signal.

4. The apparatus of claim 3, wherein the signal processor derives a time synchronization signal from the plurality of broadcast signals, further comprising:
    a clock adapted to provide a clock signal in accordance with the synchronization signal; and
    wherein the signal generator generates the known component of the television signal in accordance with the clock signal.

5. The apparatus of claim 4, wherein the signal processor derives the time synchronization signal from a global positioning system (GPS) signal.

6. The apparatus of claim 1, wherein the position signal comprises digital data, and wherein the ranging signal comprises a plurality of digital television (DTV) frames, each frame comprising a plurality of data segments, and wherein:
    the signal processor is further adapted to encode the digital data as codewords; and
    the transmitter is further adapted to replace data segments within the DTV frames with the codewords.

7. The apparatus of claim 1, wherein the transmitter is further adapted to transmit the ranging signal over a plurality of television channels.

8. An apparatus comprising:
    receiver means for receiving a plurality of broadcast signals;
    signal processor means for determining a position of the apparatus based on the received plurality of broadcast signals;
    signal generator means for generating a ranging signal comprising a known component of a television signal; and
    transmitter means for broadcasting a signal comprising the ranging signal and a position signal comprising a description of the position of the apparatus.

9. The apparatus of claim 8, wherein the known component of the television signal represents at least one of the group comprising:
    a synchronization code, found in an American Television Standards Committee (ATSC) digital television signal, comprising at least one of the group comprising
    a Field Synchronization Segment within an ATSC data frame, and
    a Synchronization Segment within a Data Segment within an ATSC data frame;
    a scattered pilot carrier found in a Japanese Integrated Services Digital Broadcasting-Terrestrial (ISDB-T) signal;
    a scattered pilot carrier found in a European Telecommunications Standards Institute (ETSI) Digital Video Broadcasting—Terrestrial (DVB-T) signal; and
    a signal, found in an analog television signal, comprising at least one of the group comprising
    a horizontal synchronization pulse,
    a horizontal blanking pulse,
    a horizontal blanking pulse and a horizontal synchronization pulse,
    a chirp-type signal, and
    a vertical interval test signal.

10. The apparatus of claim 8, wherein the plurality of broadcast signals comprises at least one of:
- a broadcast television signal; and
- a satellite positioning system signal.

11. The apparatus of claim 10, wherein the signal processor means derives a time synchronization signal from the plurality of broadcast signals, further comprising:
- clock means for providing a clock signal in accordance with the synchronization signal; and
- wherein the signal generator means generates the known component of the television signal in accordance with the clock signal.

12. The apparatus of claim 11, wherein the signal processor means derives the time synchronization signal from a global positioning system (GPS) signal.

13. The apparatus of claim 8, wherein the position signal comprises digital data, and wherein the ranging signal comprises a plurality of digital television (DTV) frames, each frame comprising a plurality of data segments, and wherein:
- the signal processor means encodes the digital data as codewords; and
- the transmitter means replaces data segments within the DTV frames with the codewords.

14. The apparatus of claim 8, wherein the transmitter means transmits the ranging signal over a plurality of television channels.

15. A method comprising:
- receiving a plurality of broadcast signals at an apparatus;
- determining a position of the apparatus based on the received plurality of broadcast signals;
- generating a ranging signal comprising a known component of a television signal; and
- broadcasting a signal comprising the ranging signal and a position signal comprising a description of the position of the apparatus.

16. The method of claim 15, wherein the known component of the television signal represents at least one of the group comprising:
- a synchronization code, found in an American Television Standards Committee (ATSC) digital television signal, comprising at least one of the group comprising
- a Field Synchronization Segment within an ATSC data frame, and
- a Synchronization Segment within a Data Segment within an ATSC data frame;
- a scattered pilot carrier found in a Japanese Integrated Services Digital Broadcasting-Terrestrial (ISDB-T) signal;
- a scattered pilot carrier found in a European Telecommunications Standards Institute (ETSI) Digital Video Broadcasting—Terrestrial (DVB-T) signal; and
- a signal, found in an analog television signal, comprising at least one of the group comprising
- a horizontal synchronization pulse,
- a horizontal blanking pulse,
- a horizontal blanking pulse and a horizontal synchronization pulse,
- a chirp-type signal, and
- a vertical interval test signal.

17. The method of claim 15, wherein the plurality of broadcast signals comprises at least one of:
- a broadcast television signal; and
- a satellite positioning system signal.

18. The method of claim 17, further comprising:
- deriving a time synchronization signal from the plurality of broadcast signals;
- providing a clock signal in accordance with the synchronization signal; and
- generating the known component of the television signal in accordance with the clock signal.

19. The method of claim 18, wherein deriving a time synchronization signal comprises:
- deriving the time synchronization signal from a global positioning system (GPS) signal.

20. The method of claim 15, wherein the position signal comprises digital data, and wherein the ranging signal comprises a plurality of digital television (DTV) frames, each frame comprising a plurality of data segments, further comprising:
- encoding the digital data as codewords; and
- replacing data segments within the DTV frames with the codewords.

21. The method of claim 15, further comprising:
- transmitting the ranging signal over a plurality of television channels.

22. Computer-readable media embodying instructions executable by a computer to perform a method comprising:
- determining a position of an apparatus based on a plurality of broadcast signals received at the apparatus; and
- causing the apparatus to broadcast a signal comprising
  - a ranging signal comprising a known component of a television signal, and
  - a position signal comprising a description of the position of the apparatus.

23. The media of claim 22, wherein the known component of the television signal represents at least one of the group comprising:
- a synchronization code, found in an American Television Standards Committee (ATSC) digital television signal, comprising at least one of the group comprising
- a Field Synchronization Segment within an ATSC data frame, and
- a Synchronization Segment within a Data Segment within an ATSC data frame;
- a scattered pilot carrier found in a Japanese Integrated Services Digital Broadcasting-Terrestrial (ISDB-T) signal;
- a scattered pilot carrier found in a European Telecommunications Standards Institute (ETSI) Digital Video Broadcasting—Terrestrial (DVB-T) signal; and
- a signal, found in an analog television signal, comprising at least one of the group comprising
- a horizontal synchronization pulse,
- a horizontal blanking pulse,
- a horizontal blanking pulse and a horizontal synchronization pulse, a chirp-type signal, and a vertical interval test signal.

24. The media of claim 22, wherein the plurality of broadcast signals comprises at least one of:

a broadcast television signal; and a satellite positioning system signal.

25. The media of claim 24, wherein the method further comprises:

deriving a time synchronization signal from the plurality of broadcast signals;

providing a clock signal in accordance with the synchronization signal; and generating the known component of the television signal in accordance with the clock signal.

26. The media of claim 25, wherein deriving a time synchronization signal comprises:

deriving the time synchronization signal from a global positioning system (GPS) signal.

27. The media of claim 22, wherein the position signal comprises digital data, and wherein the ranging signal comprises a plurality of digital television (DTV) frames, each frame comprising a plurality of data segments, wherein the method further comprises:

encoding the digital data as codewords; and replacing data segments within the DTV frames with the codewords.

28. The media of claim 22, wherein the method further comprises:

transmitting the ranging signal over a plurality of television channels.

\* \* \* \* \*